United States Patent [19]

Droulon

[11] Patent Number: 5,216,937
[45] Date of Patent: Jun. 8, 1993

[54] MECHANICAL POSITIONING JACK FOR VEHICLE SEATS

[75] Inventor: Georges Droulon, Flers, France

[73] Assignee: Bertrand Faure Automobile "BFA", Essone, France

[21] Appl. No.: 813,818

[22] Filed: Dec. 26, 1991

[30] Foreign Application Priority Data

Dec. 26, 1990 [FR] France ............... 90 16264

[51] Int. Cl.⁵ ............................................. G05G 5/18
[52] U.S. Cl. ................................. 74/586; 74/532; 248/200.1; 248/354.6; 403/104; 403/322; 403/325; 403/327
[58] Field of Search .............. 74/532, 586; 248/200.1, 248/354.1, 354.3, 354.6; 403/104, 322, 325, 327, 330

[56] References Cited

U.S. PATENT DOCUMENTS

| 312,001 | 2/1885 | Meyers | 74/532 X |
| 1,612,124 | 12/1926 | Huelsick | 74/532 X |
| 1,721,227 | 7/1929 | Manley | 74/532 |
| 2,210,797 | 8/1940 | Crim | 403/330 X |
| 3,157,416 | 11/1964 | Sandbakken | 403/104 |
| 3,197,179 | 7/1965 | Arnes et al. | 248/354.3 X |
| 4,589,301 | 5/1986 | Griner | 74/586 |

Primary Examiner—Allan D. Herrmann
Attorney, Agent, or Firm—Robert W. Becker & Associates

[57] ABSTRACT

A threaded rod of a variable length has one end connected to a first part of the element to be adjusted. A pivoted detent element cooperates with the threaded rod, with two channels extending diametrically through the pivoted detent element. The first channel has a threaded wall and the second channel has a smooth wall, the second channel forming an angle of preferably about 15° with the first channel. The pivoted detent element is pivotally mounted in a casing and has a protruding tail. A spiral spring is supported between the tail and the casing. The casing further comprises a rear portion connected to a second part of the element to be adjusted.

5 Claims, 2 Drawing Sheets

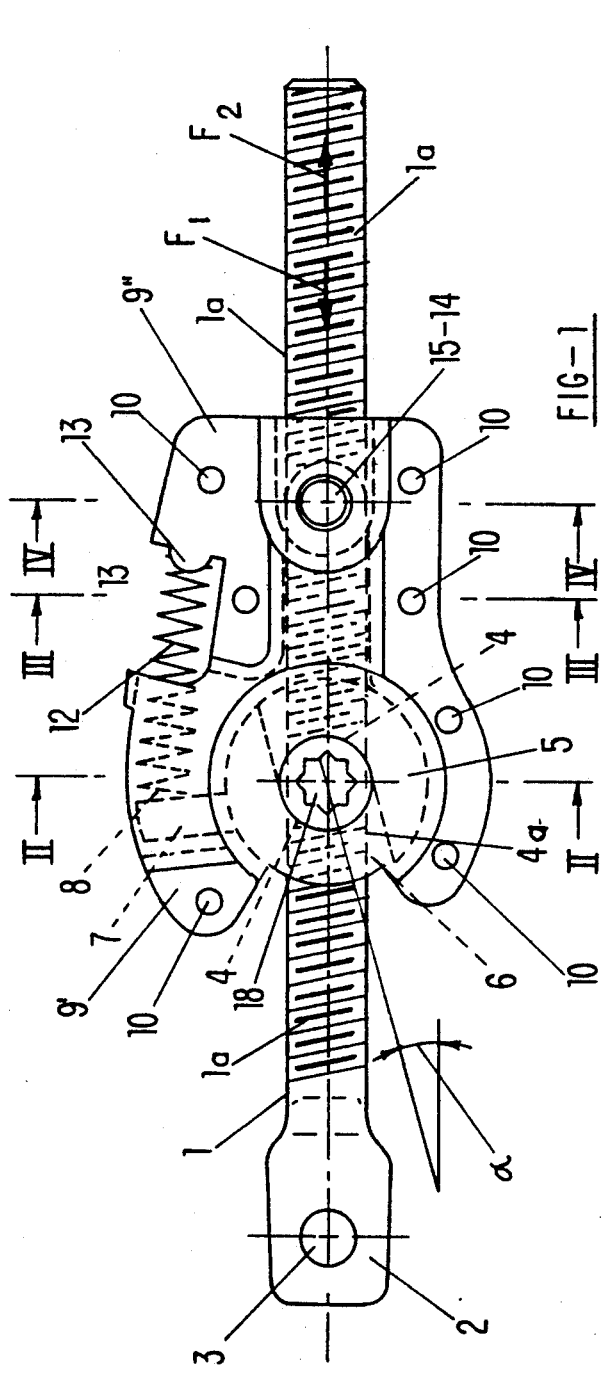
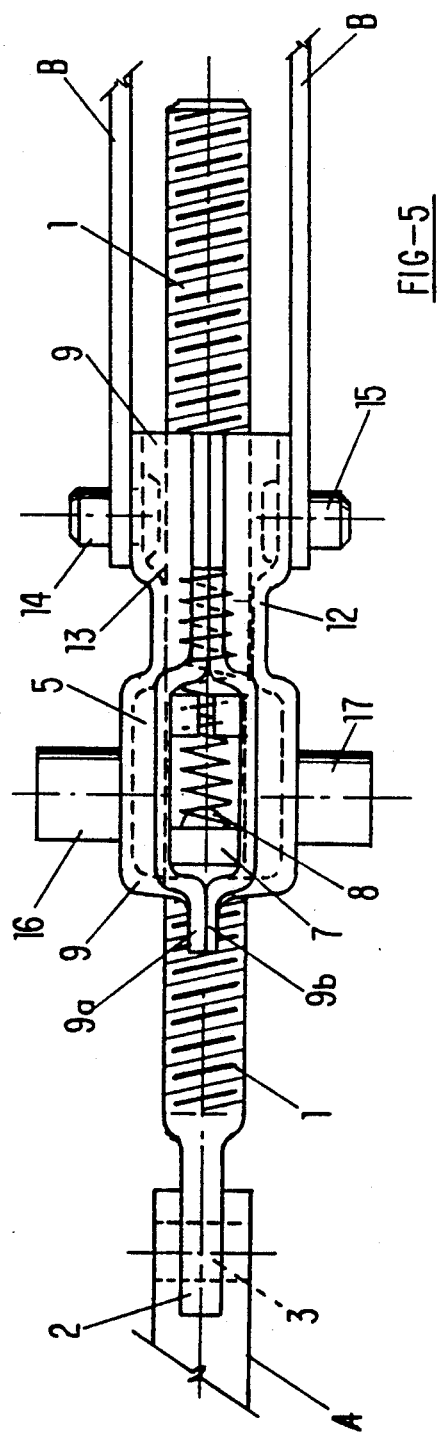

5,216,937

MECHANICAL POSITIONING JACK FOR VEHICLE SEATS

BACKGROUND OF THE INVENTION

The present invention relates to a mechanical positioning jack which can be used in a simple and practical manner for an adjustment of the discontinuous positioning of the back of a seat, an adjustment in height of a sitting portion of a seat, an adjustment in height of a seat head-rest, the displacement of a slide for the longitudinal positioning of a seat, which seat is particularly a vehicle seat and more particularly an automobile vehicle seat.

Automobile vehicles, even less expensive automobile vehicles, are more and more provided with seat equipments for the driver and the front passenger, comprising adjusting elements so as to bring each seat in conformity with the morphology of the user of the seat, in order to avoid fatigue symptoms resulting from traveling in a vehicle.

But the longitudinal adjustment of the seat by using slides, the inclination adjustment of the back of the seat, the adjustment of the under-thigh cushion placed in front of the sitting portion of the seat, the adjustment of the lumbar cushion and finally the adjustment of the head-rest, all require rather costly mechanisms all having a the disadvantage of creating unpleasant sensations, since the respective play of these mechanisms resulting from their production cannot be entirely compensated.

This is the reason why one is led to study simple, inexpensive and play-free mechanisms able to perform the aforementioned functions.

The object of the present invention is therefore a mechanical positioning jack moving step by step, i.e., providing a discontinuous positioning without play, thereby providing maximum comfort to the driver and/or to the passenger.

SUMMARY OF THE INVENTION

According to the invention, the mechanical positioning jack for an element to be adjusted is made of a threaded rod of a variable length comprising one end provided with a connecting element to be connected to a first part of the element to be adjusted, and further comprising pivoted detent element cooperating with the threaded rod, with two channels extending at an acute angle through the pivoted detent element. A first one of the two channels has a threaded wall, and a second one of the two channels has a smooth wall whereby, the second channel forms an angle with the first channel $\alpha$, the angle $\alpha$ being preferably about 15°. The element to be adjusted has a portion connected to a casing. The casing comprises a front and a rear portion. The pivoted detent element is pivotally mounted in the front portion of the casing and has a protruding tail. A spiral spring is supported between the tail and the rear portion of the casing. The rear portion of the casing is provided with two pins for fixing the casing to a second part of the element to be adjusted.

Various other features of the invention will become more apparent from the following detailed description.

BRIEF DESCRIPTION OF THE DRAWINGS

An embodiment of the invention is shown by way of non-limiting example in the accompanying drawings, wherein:

FIG. 1 is a side elevation view of the discontinous positioning mechanism of this invention;

FIG. 5 is a plan view corresponding to FIG. 1.

DETAILED DESCRIPTION OF THE INVENTION

Figure 4:
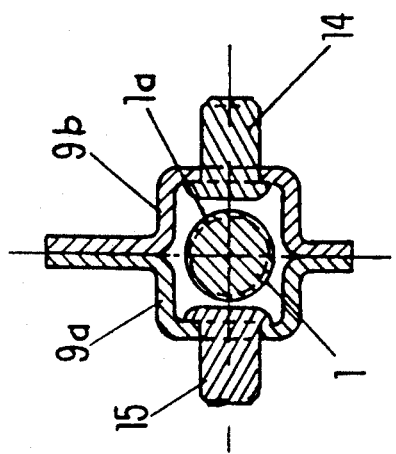
FIG. 4 is a cross sectional view along the line IV—IV of FIG. 1.
Figure 3:
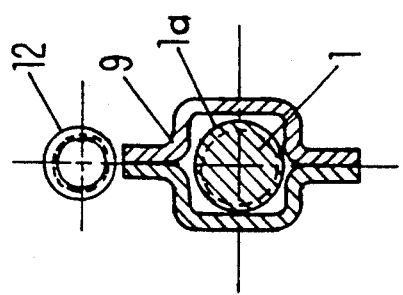
FIG. 3 is a cross sectional view along the line III—III of FIG. 1.
Figure 2:
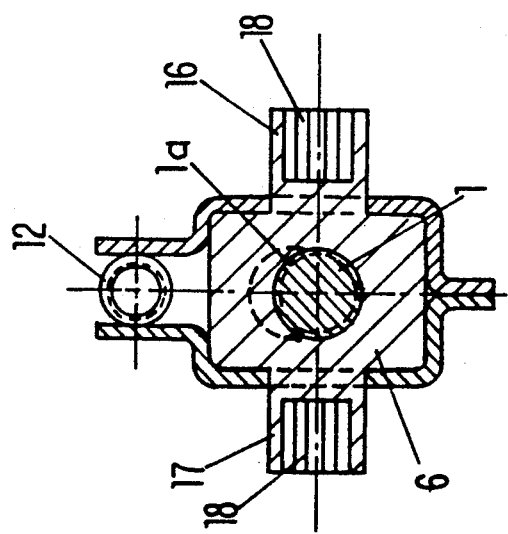
FIG. 2 is a cross sectional view along the line II—II of FIG. 1.

Referring now to the drawings, FIG. 1 shows a variable length rod 1 of a mechanical jack forming the discontinuous positioning mechanism of this invention. The rod 1 is cylindrical and has a thread 1a on its periphery.

A front end of the rod 1 is flattened so as to form a flattened head 2 through which a bore 3 extends The head 2 with the bore 3 serves to fix the rod 1, for example, to a mobile member A of a seat, this mobile member being either of the longitudinal displacement type (for example a slide) or of the angular displacement type (inclination adjustment of the back of a seat).

The rod 1 extends through a central channel 4 of a central pivoted detent element 5. As shown, the pivoted detent element 5 is also provided with a second channel 6 forming an angle $\alpha$ (see FIG. 1) with the central channel 4. The angle $\alpha$ is generally close to 15°.

The inner walls of the second channel 6, inclined according to the angle $\alpha$, are smooth while the inner walls of the central channel 4 are threaded (4a) in order to cooperate with the circular thread 1a of the rod 1.

The central pivoted detent element 5 has an upper portion provided with a tail 7 comprising, on one of its side surfaces, a protrusion 8 the purpose of which will be explained hereinafter.

The pivoted detent element 5 is placed inside a casing 9 having a front portion 9' and a rear portion 9" and made generally of two half shells 9a, 9b connected to one another by fastening elements such as, in the present case, rivets 10.

A portion of the casing 9, where the two half shells 9a, 9b are connected is narrower than the portion of the casing containing the pivoted detent element 5. This portion is provided with a spiral spring 12 supported between the protrusion 8 of the tail 7 and a protrusion 13 integral with the casing 9.

The casing 9 has, on its rear portion 9', two fixation pins 14, 15 for connecting the casing 9 to a fixed portion B of the seat, for example, an armature of the seat when it is desired to adjust the inclination of the back of a seat by means of the rod 1.

Finally, the central zone of the pivoted detent element 5 comprises two outer axial protrusions 16, 17 through which extends a control channel 18 penetrating the axial protrusions 16, 17 and the pivoted detent element 5.

The channel 18 is fluted as better shown in FIG. 1 and is adapted for receiving a control shaft provided with a control handle or a motor (not shown).

In the position shown in FIG. 1, the inner threads of the central channel 4 have engaged the threads 1a of the rod 1, and the rod 1 is blocked in the position as shown.

If it is desired to release the rod 1, the pivoted detent element 5 is rotated by using the above mentioned control shaft which is received in the central channel 18 so as to pivot the pivoted detent element 5 about an angle α. Since, the walls of second channel 6 are smooth and the walls of the central channel 4 are released from their engagement with the thread 1a by being moved away from the thread 1a of the rod 1, the rod 1 can easily be displaced, either in the direction of arrow F1 or in the direction of arrow F2 (see FIG. 1), and it is thereby possible to adjust an element the position of which must be modified.

The rotation of the pivoted detent element 5 also results in compressing the spring 12 between the protrusions 8 and 13 due to the action of the tail 7 which is pivoted together with the pivoted detent element 5. As soon as the selected position for the seat element to be adjusted has been reached, the user releases the control shaft extending through the fluted channel 18. The spring 12 relaxes and brings the pivoted detent element 5 back to its initial position, i.e., the pivoted detent element 5 pivots about an angle α in a direction contrary to the previous direction, and the toothings of the central channel 4 will engage once more the thread 1a of the rod 1 and block the rod 1 under the force exerted by the spiral spring 12.

The present invention is, of course, in no way restricted to the specific disclosure of the specification and drawings, but also encompasses any modifications within the scope of the appended claims.

What I claim is:

1. A mechanical positioning jack for an element to be adjusted, the element comprising two parts, one of which is fixed and one of which is movable, said positioning jack comprising:

a threaded rod of a variable length, one end thereof being provided with a connecting element for connecting said threaded rod to one of the two parts of the elements to be adjusted;

a pivoted detent element having two channels penetrating said pivoted detent element at an acute angle relative to one another, with said threaded rod being guided in said channels, and with a first one of said channels having a threaded inner wall and with a second one of said channels having a smooth wall, said pivoted detent element further comprising a protruding tail;

a casing having a front and a rear portion, with said pivoted detent element being pivotally mounted inside said front portion of said casing and with said protruding tail protruding from said front portion of said casing, said rear portion having two pins for fastening said casing to the other of the two parts of the element to be adjusted;

a spiral spring being supported between said protruding tail and said rear portion of said casing.

2. A mechanical positioning jack according to claim 1, wherein said angle is approximately 15°.

3. A mechanical positioning jack according to claim 1, wherein said pivoted detent element further comprises two axial protrusions on either side of said pivoted detent element and has a fluted channel, extending through said protrusions and said pivoted detent element, for receiving a control shaft for said mechanical positioning jack.

4. A mechanical positioning jack according to claim 1, wherein said connecting element is provided in the form of a flattened head of said threaded rod, having a bore penetrating said flattened head transverse to flat surfaces of said flattened head.

5. A mechanical positioning jack according to claim 1, wherein said casing is comprised of two half shells having a jointing plane perpendicular to an axis of said pivoted detent element, said half shells being connected to one another by fastening elements.

* * * * *